US011414099B2

(12) United States Patent
Taylor et al.

(10) Patent No.: US 11,414,099 B2
(45) Date of Patent: Aug. 16, 2022

(54) DYNAMIC STOP TIME THRESHOLD SELECTION FOR HANDS-FREE DRIVING

(71) Applicant: Ford Global Technologies, LLC, Dearborn, MI (US)

(72) Inventors: Alexandra Taylor, Harbor Springs, MI (US); Ali Hassani, Ann Arbor, MI (US); Darren Lee, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 167 days.

(21) Appl. No.: 17/006,623

(22) Filed: Aug. 28, 2020

(65) Prior Publication Data

US 2022/0063652 A1    Mar. 3, 2022

(51) Int. Cl.
*B60W 60/00* (2020.01)
*B60W 40/08* (2012.01)
*G01C 21/00* (2006.01)
*B60W 30/14* (2006.01)
*B60W 30/12* (2020.01)

(52) U.S. Cl.
CPC .......... *B60W 60/001* (2020.02); *B60W 30/12* (2013.01); *B60W 30/14* (2013.01); *B60W 40/08* (2013.01); *G01C 21/3833* (2020.08); *B60W 2420/42* (2013.01); *B60W 2420/52* (2013.01); *B60W 2540/10* (2013.01); *B60W 2540/223* (2020.02); *B60W 2540/225* (2020.02); *B60W 2540/229* (2020.02); *B60W 2554/4029* (2020.02); *B60W 2555/00* (2020.02); *B60W 2556/45* (2020.02)

(58) Field of Classification Search
None
See application file for complete search history.

(56) References Cited

U.S. PATENT DOCUMENTS

| 2013/0191003 A1 | 7/2013 | Hahne et al. |
| 2018/0222480 A1 | 8/2018 | Shokonji |
| 2019/0047585 A1 | 2/2019 | Kagerer et al. |

FOREIGN PATENT DOCUMENTS

JP    2018-86874 A    6/2018

*Primary Examiner* — David P. Merlino
(74) *Attorney, Agent, or Firm* — Frank L. Lollo

(57) ABSTRACT

A vehicle includes an automated driving assistance system that controls maneuvering of the vehicle under certain conditions. When the vehicle comes to a stop, the driving assistance system dynamically selects a threshold stop time corresponding to a duration of time that the vehicle can remain stopped before the driving assistance system will either detect a physical action from the user to resume automated driving assistance or time out and cease the driving assistance.

20 Claims, 5 Drawing Sheets

| | A | B | C | D | E | F |
|---|---|---|---|---|---|---|
| HIGH-RES MAPS | Y | N | Y | Y | Y | Y |
| ATTENTIVE DRIVER | Y | Y | Y | Y | Y | N |
| PEDESTRIAN PRESENT | N | N | N | Y | N | N |
| ANIMAL PRESENT | N | N | N | N | Y | N |
| STOP LIGHT OR STEP SIGN | Y | N | N | N | N | Y |
| THRESHOLD STOP TIME | 15s | 5s | INDEF | 0s | 0s | 2s |

DYNAMIC STOP TIME THRESHOLD SELECTION FOR HANDS-FREE DRIVING

BACKGROUND

Technical Field

The present disclosure relates to hands-free driving for a vehicle.

Description of the Related Art

Many modern vehicles are equipped with Adaptive Cruise Control (ACC) based driving assist systems, which maneuver the vehicle according to a driver-selected speed and a gap distance between the vehicle and another vehicle. The driving assist system adjusts the speed of the vehicle to maintain the set gap distance and to avoid collision with other vehicles or obstacles. The driving assist system reduces the speed of the vehicle or even stops the vehicle if another vehicle slows down or comes to a halt in front of the vehicle. In many vehicles, the driving assist system ceases controlling the vehicle once the vehicle has stopped.

Some driving assist systems include a stop-and-go ACC, which are driving assist systems that can resume the control of the vehicle even after the vehicle has stopped. In such vehicles, the driving assist system waits for a predetermined time period after the vehicle has come to the stop before releasing the control of the vehicle. In general, the predetermined time period is fixed, short, and is set during the manufacturing stage of the vehicle. After the short time period has elapsed, the ACC system waits for the driver to provide a specific action before the ACC will resume control of the vehicle.

BRIEF SUMMARY

Embodiments of the present disclosure provide a driving assist system that is convenient and safe in stop-and-go traffic situations. Embodiments of the present disclosure reduce the frequency with which drivers perform a physical action to resume driving assistance after a stop. Embodiments of the present disclosure take into account various environmental and driver-based factors to enable the driving assist system to continue providing driving assist services even after relatively long stops.

Embodiments of the present disclosure dynamically select a threshold stop time for a vehicle each time the vehicle comes to a stop. The threshold stop time is a duration of time beyond which the driver will perform a physical action to resume the driving assist functionality. The threshold stop time is selected based on driver attention and environmental factors to ensure that driving assistance can be automatically and safely resumed without driver input in a larger number of situations than traditional driving assist systems.

In one embodiment, a method is provided in which a driving assist system of a vehicle provides automated driving assistance to a driver of the vehicle by monitoring one or more attention indicators of the driver. The one or more attention indicators determine whether the driver is paying attention to a driving environment of the vehicle. The method further includes storing a map of a current location of the vehicle in a map system of the vehicle to provide information about the driving environment. The method includes selecting a threshold stop time based on the one or more attention indicators and a resolution of the map of the current location of the vehicle. The method includes resuming automated driving assistance responsive to detecting engagement of a mechanism by the driver if the vehicle has been stopped longer than the threshold stop time.

In one embodiment, a vehicle includes one or more cameras configured to capture images of a driver. The vehicle includes a driver attention analysis system configured to analyze the images and to monitor attention indicators of the driver based on the images. The vehicle includes a map system configured to store a map of a current location. The vehicle includes a driving assist system configured to provide automated driving assistance and to select a threshold stop time for resuming automated driving assistance after a stop based on a resolution of the map and the attention indicators.

In one embodiment, a method includes providing, with a driving assist system of a vehicle, automated driving assistance to a driver of the vehicle and detecting that the vehicle has stopped. The method includes selecting, with the driving assist system while the vehicle is stopped, a threshold stop time based, at least in part, on a resolution of a map of a current location of the vehicle. The method includes resuming automated driving assistance if the vehicle is stopped for a duration shorter than the threshold stop time and awaiting an action from the driver of the vehicle before resuming automated driving assistance if the vehicle is stopped for a duration longer than the threshold stop time.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1:
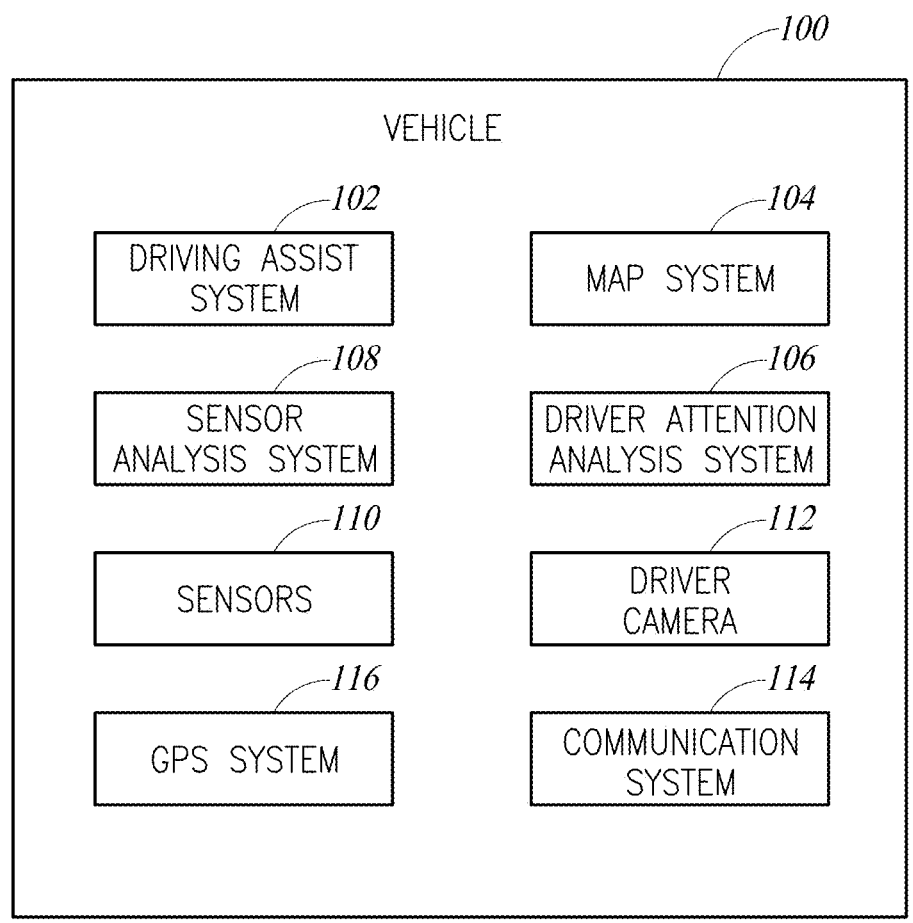
FIG. 1 is a block diagram of a vehicle, according to one embodiment of the present disclosure.

FIG. 1 is a block diagram of a vehicle 100, according to one embodiment. The vehicle 100 may be any motor vehicle such as a car, van, or bus, using any known powertrain and propulsion system, such as a combustion engine, a battery powered electric motor, or a hybrid motor.

The vehicle 100 includes a driving assist system 102 that is configured to provide automated driving assistance to a driver of the vehicle 100. Examples of the automated driving assistance include automated cruise control, adaptive cruise control, and automated lane-centering assistance, among others. The automated driving assistance may include hands-free driving assistance. Hands-free driving assistance can include steering the vehicle and activating turn signals or other mechanisms without manual input from the user. Accordingly, the driving assist system 102 can control cruising or maneuvering of the vehicle 100.

The driving assist system 102 controls maneuvering of the vehicle 100 according to a gap distance of the vehicle 100 from another vehicle directly in front of the vehicle 100. The gap distance can be determined by the driving assist system 102 based on the current speed of the vehicle 100 and other traffic conditions. The driving assist system 102 may adjust the speed of the vehicle 100 to maintain the gap distance, to avoid collision with the other vehicle. The driving assist system 102 may reduce the speed of the vehicle 100, if the other vehicle slows down. Further, the driving assist system 102 may stop the vehicle 100 if the other vehicle comes to a halt or if any obstacle is detected in front of the vehicle 100.

The driving assist system 102 may also provide a stop-and-go feature that allows the driving assist system 102 to resume maneuvering of the vehicle 100 after the vehicle stops. If the vehicle 100 stops because the vehicle ahead has stopped, the driving assist system 102 can resume maneuvering the vehicle 100 from the stop once the vehicle ahead begins moving again.

The driving assist system 102 automatically resumes or maintains control of the vehicle 100 from the stop state, if a stop time of the vehicle 100 is shorter than a threshold stop time. In contrast, the driving assist system 102 releases the control of the vehicle 100 if the stop time of the vehicle 100 is longer than the threshold stop time.

If the stop time of the vehicle 100 is longer than the threshold stop time, the driving assist system 102 will not resume driving assistance until the driver performs a confirmation action. The confirmation action allows the driving assist system 102 to take control of the vehicle 100. The confirmation action of the driver may include physically engaging a mechanism, such as physically engaging an accelerator (not shown) of the vehicle 100. The confirmation action ensures that the driver remains attentive and can take control of the vehicle 100.

For traditional vehicles with stop-and-go automated cruise control, the threshold stop time is fixed and relatively short, for example, about 2 seconds. The relatively short threshold stop time ensures that the driver remains active and can take control of the vehicle 100 in unfavorable road conditions or traffic conditions. Nevertheless, although having a short threshold stop time can help ensure driver safety, during traffic conditions the driver of the traditional vehicle may perform frequent confirmation actions.

The driving assist system 102 provides a dynamic threshold stop time instead of the fixed threshold stop time. The driving assist system 102 facilitates the dynamic threshold stop time based on one or more factors including, but not limited to, the resolution of a map of a current location of the vehicle 100, attention indicators of the driver, and an external environment of the vehicle 100. The threshold stop time may be based on attention indicators because if the driver is paying close attention to the road, then a longer threshold stop time may be warranted. The threshold stop time may be based on the external environment of the vehicle 100 because the presence of pedestrians, animals, traffic signs, intersections, or debris in the road may warrant shorter threshold stop times. The threshold stop time may be based on the resolution of the map, because with a higher resolution map the driving assist system 102 has more complete information about the road and environmental features around the road, as will be set forth in more detail below. The more complete information may warrant longer threshold stop times.

The driving assist system 102 obtains the information related to the resolution of the map of the current location of the vehicle 100, attention indicators of the driver, external environment of the vehicle 100 to select an appropriate threshold stop time, or a combination of this information. The information related to the resolution of the map indicates whether the map is a high-resolution map or a low-resolution map. Further, the information related to the attention indicators of the driver indicates whether or not the driver is paying attention to the driving environment of the vehicle 100. The information related to the external environment of the vehicle 100 indicates whether or not an animal, a pedestrian, or a traffic sign, for example, are present in the external environment of the vehicle 100. The driving assist system 102 can dynamically determine a threshold stop time based on one or more of these factors.

The driving assist system 102 maintains a pool of threshold stop times and selects the appropriate threshold stop time from the pool depending on the situation. If the driver is paying attention to a driving environment of the vehicle 100 and the map of the current location of the vehicle 100 is a high-resolution map, the threshold stop time may be indefinite. This indicates that the driving assist system 102 can resume the maneuvering of the vehicle 100 without an input or confirmation action from the driver. If a pedestrian or an animal is present in the expected path of the vehicle 100, the threshold stop time may be 0 seconds, which indicates that the driver may continuously have to perform the confirmation action for the driving assist system 102 to resume maneuvering the vehicle.

The driving assist system 102 may provide the automated driving assistance based on the one or more factors discussed above. The factors include the resolution of the map of the current location of the vehicle 100, the attention indicators of the driver, and the external environment of the vehicle 100. If the attention indicators confirm that the driver is not paying attention to the driving environment of the vehicle 100, the driving assist system 102 may stop or may slow down the vehicle 100.

The vehicle 100 may include a map system 104, a driver attention analysis system 106, a sensor analysis system 108, and a Global Positioning System (GPS) 116. The driving assist system 102 may utilize these systems to select the appropriate threshold stop time. The driving assist system 102 may obtain the information from the map system 104, the driver attention system 106, the sensor analysis system 108 and the GPS system 116 via a communication system 114.

The communication system 114 facilitates communication with internal and external entities. For instance, communication with the internal entities can include communication among various systems of the vehicle 100. External communication allows communication of the various systems of the vehicle 100 with the one or more external entities, such as but not limited to external databases, systems, or organizations.

The communication system 114 may include a wireless or a wired network. The wireless network may include cellular, Wi-Fi, Bluetooth, NFC, or other similar wireless networks. The wired communication may be done using Ethernet cables or other suitable techniques. The internal communication may be facilitated via the wired network, whereas the wireless network may be employed for all external communications.

Further, the driving assist system 102 may employ the GPS 116 to determine a current location of the vehicle 100. The driving assist system 102 of the vehicle 100 obtains map data related to the current location of the vehicle 100 using the map system 104. To obtain the map data, the map system 104 may communicate with one or more external systems to obtain the map data. The map system 104 may communicate with a remote system, such as a remote server, to obtain the map data.

While not shown explicitly, the map system 104 may include a memory that stores map data obtained from the remote system. The map data may include the map, information indicating the resolution of the map, and objects present in the current location of the vehicle 100. The map data may be stored in the map system, a separate memory of the vehicle 100, or in a cloud based memory external to the vehicle 100.

The map system 104 may employ the communication system 114 to communicate with the remote system. As the vehicle 100 travels, the map system 104 receives updated map data from the remote system. In some cases, the map system 104 may only store the map data of a region proximate to the current location of the vehicle 100 to efficiently manage memory utilization of the map system 104.

The previously generated map data stored or received by the map system 104 may be considered a seed map. While traveling, the vehicle 100 will also generate real time map data. The real time map data augments the seed map with current road conditions including the presences of other vehicles, animals, pedestrians, and objects. In some cases a seed map will not be available and the real time map will be the only map data available. This can correspond to a low resolution map for purposes of determining a threshold stop time. If the seed map is present, the combination of the seed map and the real time map data can correspond to a high resolution map for purposes of determining a threshold stop time. The generation of the real time map is described in further detail below with reference to the sensors 110 and sensor analysis system 108.

The map system 104 may further include a map processor. The map processor may process the map data stored in the memory to analyze the resolution of the map. The map processor may apply artificial intelligence or machine learning-based algorithms to analyze the map data and determine the resolution of the map. The map processor may assign a numerical value to signify the resolution of the map and the map processor compares the numerical value against a threshold value. If the numerical value of the map is greater than the threshold value, the map will be considered as the high-resolution map.

The map processor processes the map data to identify various objects present in the current location of the vehicle 100 including traffic signs, road surface markings, landmarks, or a road condition. The map processor may apply artificial intelligence or machine learning-based algorithms to analyze the map data and determine the objects.

The map system 104 or the driving assist system 102 or a combination of the map and driving assist system may classify the available map of the current location as either high resolution or low resolution. One reason for this is that there are various ways that the map of the current location can be generated. A low resolution map may be based on aerial maps and road map data. A high resolution may be further based on high fidelity mapping performed by a mapping vehicle that has driven through the area. The mapping vehicle may include a suite of sensors such as one or more of LIDAR (Light Detection and Ranging), Radar, visible light, infrared, and ultraviolet imaging systems. These systems generate a highly detailed map of the road, surrounding objects, traffic signs, the presence of guard rails, divider medians, road damage, and other factors. The high resolution map may include a three-dimensional map of the area. The mapping vehicle uploads the high resolution map to a remote map system. The map system 104 of the vehicle 100 can receive the high resolution map from the remote map system. Such a high resolution map may be available for some locations but not for others. When the high resolution map is available, the driving assist system has more detailed information about the road and other aspects of the environment around the road. The more detailed information about the road and the surrounding environment can enable the driving assist system to provide longer threshold stop times than when only low resolution maps are available. The high resolution map may include details such as how steep a road is, whether guard rails are present, whether the road is divided, whether there are hazard features such as trees or rocks near the edge of the road, whether there are blind turns nearby, or other risk factors. Accordingly, as set forth above, the driving assist system can use the resolution of the map as a factor in determining the threshold stop time.

The vehicle 100 includes one or more cameras 112 that assist in determining a threshold stop time. The cameras 112 can be positioned within the cabin of the vehicle 100. The cameras 112 are configured to capture images of the driver of the vehicle 100. The one or more cameras 112 may capture images of the eyes or the head of the driver of the vehicle 100. The images of the driver can be helpful in determining the threshold stop time, as will be explained in more detail below.

The driver attention analysis system 106 assists the driving assist system 102 to select the appropriate threshold stop time. In order to determine the driver attentiveness, the driving assist system 102 of the vehicle 100 may obtain information related to the attention indicators of the driver from the driver attention analysis system 106 via the communication system 114. The driver attention analysis system 106 processes the images captured by one or more cameras 112 to monitor the attention indicators of the driver. Analysis of the images captured by the one or more cameras 112 aids in determining whether or not the driver is paying attention to the driving environment of the vehicle 100.

The attention indicators may include a position of the eyes of the driver. The driver attention analysis system 106 may detect the gazing direction of the driver, a tilt of the head of the driver to monitor the attention indicators of the driver, or a combination of these movements. The driver attention analysis system 106 may determine whether or not the driver is looking at the road or in a rear-view mirror or at pertinent environmental objects detected by the other sensors or identified in the map. Examples of pertinent environmental objects would include vehicles or pedestrians who are in the primary path of the vehicle, within a local geofence, or identified to have a trajectory with the vehicle and its blind spots. If the driver is looking at the road or in the rear-view mirror or at the pertinent environmental objects, the driver attention analysis system 106 may consider that the driver is paying attention to the driving environment. This may be a weighted function as well, where a higher attention score may be associated with gaze tracking objects in primary vehicle path versus outside the path (e.g. monitoring a pertinent object detected by the blind spot monitoring sensors). Furthermore, the driver attention analysis system 106 may also detect a drowsiness level of the driver utilizing techniques such as eye closure percentage, head motion and deep learning. Eyes that are not open very wide may be an indication of drowsiness.

The one or more cameras 112 may be positioned at any suitable location on the vehicle 100, such that the eyes and the head of the driver are always in a field of view of the one or more cameras 112. The one or more cameras 112 may be positioned on an instrument panel of the vehicle 100. Additionally, or alternatively, the one or more cameras 112 may be positioned behind a steering wheel (proximate to the instrument panel) of the vehicle 100. Other cameras may be positioned on the rear-view mirror, in ceiling adjacent to a visor, or along a driver's side support beam adjacent to a door frame.

The driver attention analysis system 106 may be a suitable processing device or set of processing devices including, but not limited to, a microprocessor, a microcontroller-based platform, a suitable integrated circuit, one or more field-programmable gate arrays, or application-specific integrated circuits. The driver attention analysis system 106 may apply artificial intelligence or machine learning-based algorithms on the images obtained from the one or more cameras 112 to monitor attention indicators of the driver. A shape of the driver's eyes and average distance between an upper and lower eyelid can be determined over time and then utilized in the drowsiness evaluation. Such information can be used and processed to determine threshold attentiveness measures based on the typical behaviors of particular drivers. The vehicle may be able to determine between different regular drivers and apply the specific threshold measures based on identified driver.

The sensors 110 of the vehicle 100 are configured to sense the external environment of the vehicle 100. The sensors 110 are installed on the vehicle 100. The sensors 110 are configured to detect and track objects external to the vehicle 100. The sensors 110 can detect and track other vehicles in the vicinity of the vehicle 100. The sensors 110 can detect pedestrians, animals, traffic signs, traffic signals, and other objects or landmarks present in the external environment of the vehicle 100. The memory sub-system stores the signals or data obtained from the sensors 110 and the results of the analysis of the signals or data obtained from the sensors 110.

The sensors 110 may include one or more of a radar sensor, a laser sensor, a sound sensor, a magnetic sensor, a LIDAR sensor, an image sensor, or other suitable sensors. The sensors 110 generate sensor signals or sensor data indicative of the objects in the surrounding environment of the vehicle 100. The sensor signals or sensor data may be utilized to assist in determining a stop threshold time, as will be described in more detail below.

The sensor analysis system 108 is used to analyze the sensor signals or sensor data provided by the sensors 110. Accordingly, the sensor analysis system 108 receives the sensor signals from the sensors 110, and obtains information about the external environment of the vehicle 100. The analysis performed by the sensor analysis system 108 can be utilized by the driving assist system 102 to select the appropriate threshold stop time by the driving assist system 102. The sensor analysis system 108 may assist in detecting obstacles in the path of the vehicle 100 and information related to the obstacles. For example, a distance of the obstacle from the vehicle 100, a position of the obstacle, and a type of the obstacle (i.e., whether the obstacle is a pedestrian or the animal) is detected by the sensor analysis system 108.

The sensor analysis system 108 may also assist in detecting driving conditions. Exemplary driving conditions include the condition of the road, curvature of the road, road surface markings, lane boundaries, a position of the vehicle 100 with respect to the lane boundaries, or the gap distance from another vehicle moving ahead. Additionally, the sensor analysis system 108 may assist in detecting weather conditions, such as wind speed, rain, humidity level, and temperature, for example.

The sensor analysis system 108 may include various sub-systems such as a processing sub-system, and a memory sub-system. The processing sub-system may be a suitable processing device or a set of processing devices such as, but not limited to, a microprocessor, a microcontroller-based platform, a suitable integrated circuit, one or more field-programmable gate arrays, or application-specific integrated circuits. The processing sub-system may apply artificial intelligence or machine learning-based algorithms on signals or data obtained from sensors 110.

The sensors 110 and the sensor analysis system 108 can assist in generating or augmenting the map utilized by the map system 104. In particular, the vehicle 100 generates map data in real-time as the vehicle 100 travels through an environment. The vehicle 100 can utilize sensors 110 including radar, LIDAR, image sensors, magnetic sensors, sound sensors, and other types of sensors to generate a map of the environment in real-time. The sensor analysis system 108 can assist in generating the map by analyzing signals generated by the various sensors 110. In some cases, the vehicle 100 can previously download or store some aspects of the map and can generate additional aspects of the map in real-time. For example, the map system 104 may download or otherwise receive map data from one or more remote systems and may then augment the map data in real-time by utilizing the sensors 110 and the sensor analysis system 108. The map, generated wholly are partially in real-time, may be a low resolution map or a high resolution map and may be utilized by the driving assist system 102 accordingly. Furthermore, the map can be utilized in applications other than automated driving assistance. For example, the map can be utilized by the vehicle to give visual or audio, guidance, directions, or warnings to the user. Accordingly, the vehicle 102 can utilize the map for hands-free and hands-on driving assistance.

In one embodiment, the map system stores 104 stores a seed map. The seed map is previously generated map data received by or stored in the vehicle 100 as described previously. As the vehicle 100 travels, the vehicle 100 augments the seed map by generating additional current map data in real time. The current map data includes dynamic maps of nearby vehicles, objects, pedestrians, animals, or other objects and structures that were not present at the time that the seed map was generated. The current map data is dynamically generated by the sensors 110 and the sensor analysis system 108 as described previously. The combination of the previously stored seed map and the newly generated map data can result in a high resolution map. The presence of the high resolution map is one of the factors in determining the threshold stop time, as described above.

In some cases, a seed map is not present on the vehicle 100. The vehicle 100 utilizes the sensors 110 and the sensor analysis system 108 to generate a map of the current surroundings including nearby vehicles, objects, pedestrians, animals, structures in real time. The presence of the currently generated map that lacks the seed map can correspond to a low resolution map. The presence of the low resolution map is one of the factors in determining the threshold stop time, as described above.

Figure 2:
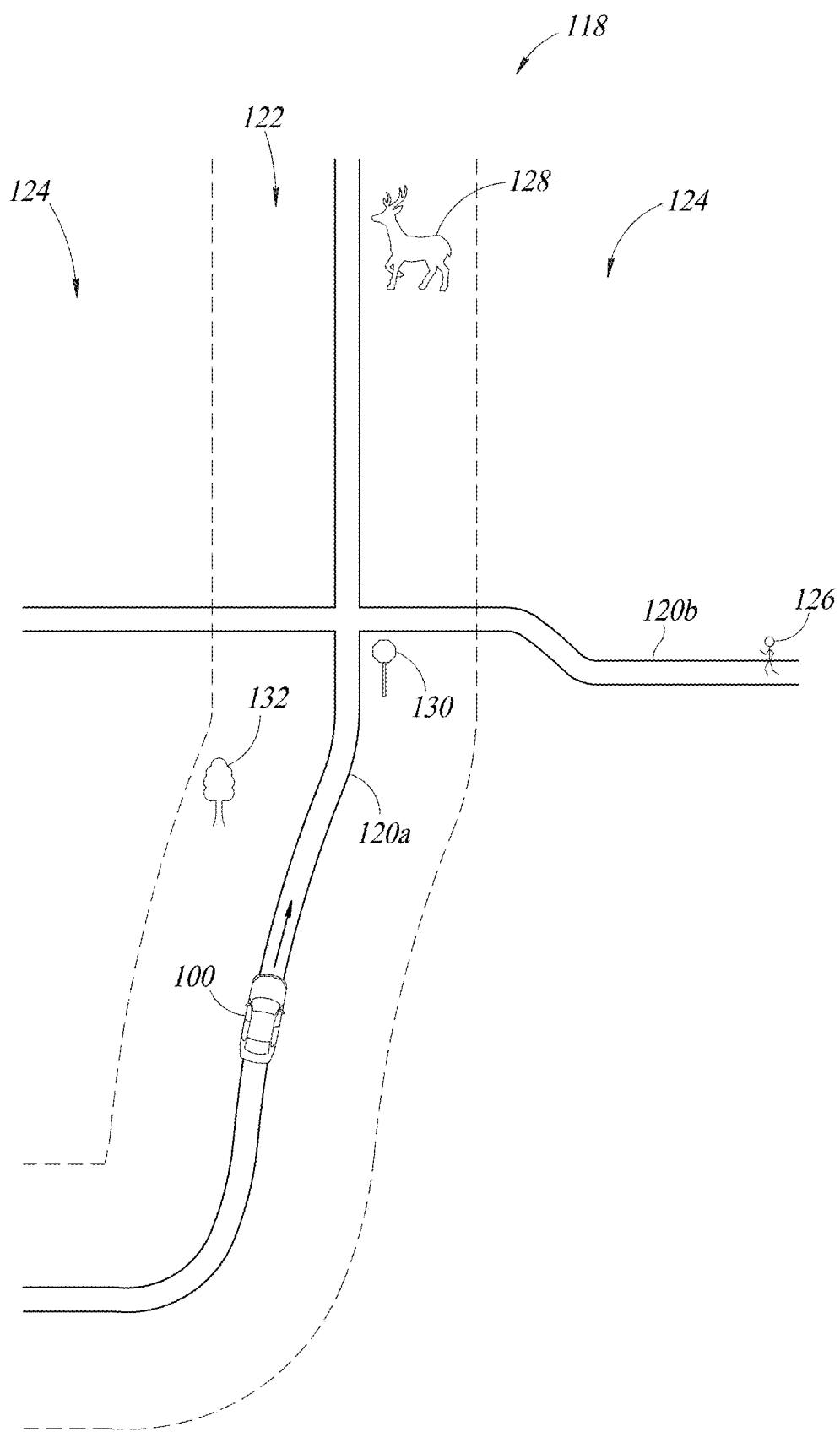
FIG. 2 is an illustration of a driving environment indicating zones of high-resolution map availability, according to one embodiment of the present disclosure.

FIG. 2 is an illustration of a driving environment 118 and the vehicle 100 passing through the driving environment. The depicted driving environment 118 has a first road 120a and a second road 120b. In the shown embodiment, the vehicle 100 is maneuvering along the first road 120a.

The driving environment 118 further includes a high-resolution map zone 122 and a low-resolution map zone 124. As can be seen in FIG. 2, the high-resolution map zone 122 is defined by the first road 120a along with an intersecting portion of the second road 120b. The low-resolution map zone 124 includes a distal portion of the second road 120b.

As discussed in FIG. 1, the vehicle 100 includes the stop-and-go based autonomous driving assistance feature and has the systems necessary to facilitate the automated driving assistance to the driver. To that end, the driving assist system 102 (illustrated in FIG. 1) of the vehicle 100 facilitates the automated driving assistance based on the data obtained from the map system 104, the driver attention analysis system 106, and the sensor analysis system 108.

The driving assist system 102 of the vehicle 100 may select the threshold stop time based on the map of the current location and the environmental data of the vehicle 100. In particular, the threshold stop time selected is based on the resolution of the map obtained by the map system 104 and the environmental data generated by the sensor analysis system 108.

As the map generated for the high-resolution map zone 122 of the vehicle 100 will have a greater resolution as compared to the resolution of the low-resolution map zone 124, the threshold stop time selected for the two map zones 122 and 124 may vary. The threshold stop time estimated for the high-resolution map zone 122 may be shorter than the threshold stop time for the low-resolution map zone 124.

As the vehicle 100 is maneuvering along the high-resolution map zone 122 as shown in FIG. 2, the selection of the threshold stop time is estimated based, at least in part, on the environmental data generated by the sensor analysis system 108. The presence or lack of obstacles, pedestrians, or animals can influence the threshold stop time. For instance, if the environment data does not indicate any obstacle, the selected threshold stop time may be quite long or even indefinite.

In contrast, the driving environment 118 may include one or more obstacles, such as a pedestrian 126, an animal 128, or a traffic sign 130. As the one or more obstacles come closer to the vehicle 100, the sensor analysis system 108 generates the environmental data indicating the presence of the one or more obstacles. As a result, the threshold stop time would be relatively short, or even 0 seconds.

The driving environment 118 includes a landmark 132. The landmark 132 may be detected by the sensors 110 and the sensor analysis system 108. The presence of the landmark 132 can be used by the map system, together with data from the GPS 116, to precisely identify the location of the vehicle 100 within the map. This can help ensure that the vehicle 100 is properly centered in the map.

The embodiment discussed in FIG. 2 utilizes environmental data and resolution of the map to select the threshold stop time for the vehicle 100 moving the automated driving mode. However, it should be noted that one or more other factors may be utilized as well, such as driver attentiveness, to select the appropriate threshold stop time, as discussed above in FIG. 1.

The selected threshold stop time for a region or a road with the high-resolution map data would be lesser as compared to the selected threshold stop time for a region or a road with the low-resolution map data, assuming that the other factors, such as driver attentiveness or the absence of obstacles, remain constant. Therefore, on the road 102a with the high-resolution maps, less frequent confirmation actions from the driver are utilized as compared to the road 102b with the low-resolution maps, when the driving assist system 102 is maneuvering the vehicle 100.

Figure 3:
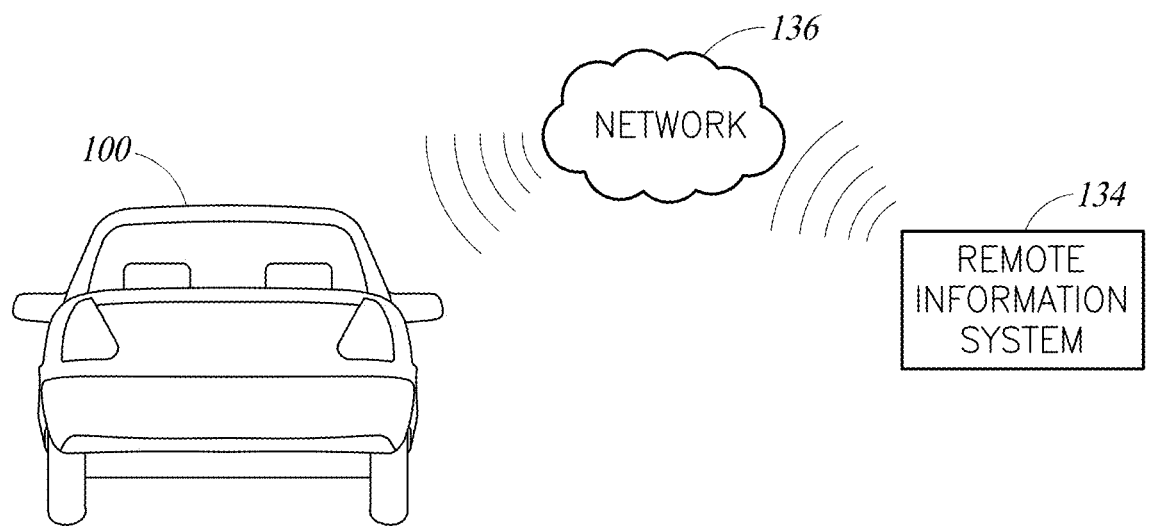
FIG. 3 is an illustration of a map update system, according to one embodiment of the present disclosure.

FIG. 3 is an illustration of updating the map stored in the map system 104 of the vehicle 100. The map is updated in real-time as the vehicle 100 travels along a road (such as the road 120 shown in FIG. 2). At any given point, the map indicates the current location of the vehicle 100.

The vehicle 100 receives map data from a remote information system 134. In particular, the vehicle receives the map data from a network 136. The network 136 communicatively couples the remote information system 134 to the vehicle 100.

In particular, the vehicle 100 communicates with the remote information system 134 to obtain the map data, which may be used to update the map indicating the current location of the vehicle 100. The remote information system 134 maintains a repository of the map data including data related to one or more regions, landmarks, and roads. The remote information system 134 may be a server or a database hosted by governmental or non-governmental organizations. Further, the remote information system 134 may be hosted on a cloud platform.

The map system 104 obtains the map data for a current location of the vehicle 100, where the current location of the vehicle 100 is obtained from the GPS 116. The map data is stored in the memory of the map system 104, such that the map data is updated in real-time as the vehicle 100 maneuvers along the road.

The network 136 may be a wireless network. Exemplary wireless network may include a cellular, a Wi-Fi, a Bluetooth, an NFC, or other similar wireless communication networks. In practice, the network 136 may include a plurality of connected networks that collectively link the vehicle 100 to the remote information system 134.

Figure 4:
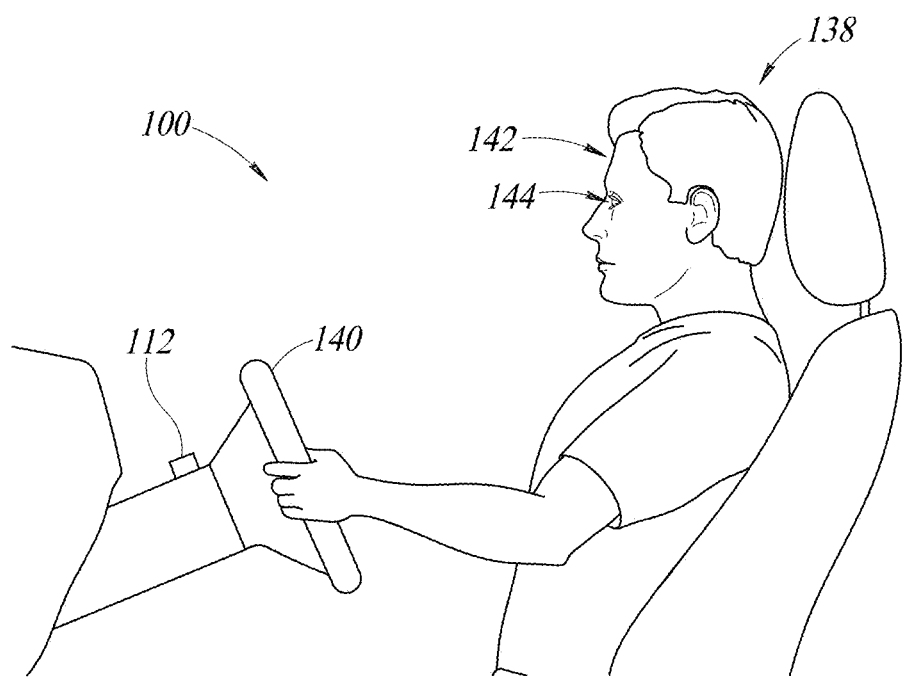
FIG. 4 is an illustration of an interior of the vehicle including a camera, according to one embodiment of the present disclosure.

FIG. 4 is an illustration of an interior of the vehicle 100, according to one embodiment. A driver 138 can control maneuvering of the vehicle 100 in a normal driving mode. In addition, the driver 138 can allow the driving assist system 102 to control maneuvering of the vehicle 100 by putting the vehicle 100 in the automated cruise control mode. A co-passenger can also put the vehicle 100 in the automated cruise control mode.

The driving assist system 102 of the vehicle 100 selects the appropriate threshold stop time based on the one or more attention indicators of the driver 138. To select the threshold stop time, the driving assist system 102 employs the one or cameras 112 that can monitor the attention indicators of the driver 138. Further, the one or more cameras 112 may include lenses or filters to capture light in either or both of the visible spectrum and the infrared spectrum.

The one or more cameras 112 may be positioned between a steering wheel 140 and an instrument panel of the vehicle 100. However, it should be noted that the one or more cameras 112 may be positioned at any suitable location on the vehicle 100 so that the eyes 144 and the head 142 of the driver 138 are always in a field of view of the one or more cameras 112. For instance, the one or cameras 112 may be positioned on an instrument panel (not illustrated) of the vehicle 100. The one or more cameras 112 may be positioned on the rear-view mirror (not illustrated) of the vehicle 100.

The images captured by the one or more cameras 112 are communicated to the driver attention analysis system 106 (illustrated in FIG. 1) of the vehicle 100 for processing. The driver attention analysis system 106 processes the images received from the one or more cameras 112 to monitor the attention indicators of the driver 138, thereby detecting an attention level of the driver 138. The attention indicators may include the position of the eyes 144 of the driver 138. The driver attention analysis system 106 may detect the gazing direction of the driver 138 and a tilt of the head 142 of the driver 138 to monitor the attentiveness of the driver 138. The driver attention analysis system 106 may determine whether or not the driver 138 is looking at the road, such as the road 120, or in the rear-view mirror, and accordingly detects the attention level of the driver 138. Further, the driver attention analysis system 106 may detect the drowsiness level of the eyes 144 of the driver 138 to monitor the attentiveness of the driver 138.

The one or more cameras 112 may be a computer vision-based camera. The one or more cameras 112 may monitor and analyze the attention indicators in real-time to determine whether or not the driver 138 is attentive.

Figures 5, 6:
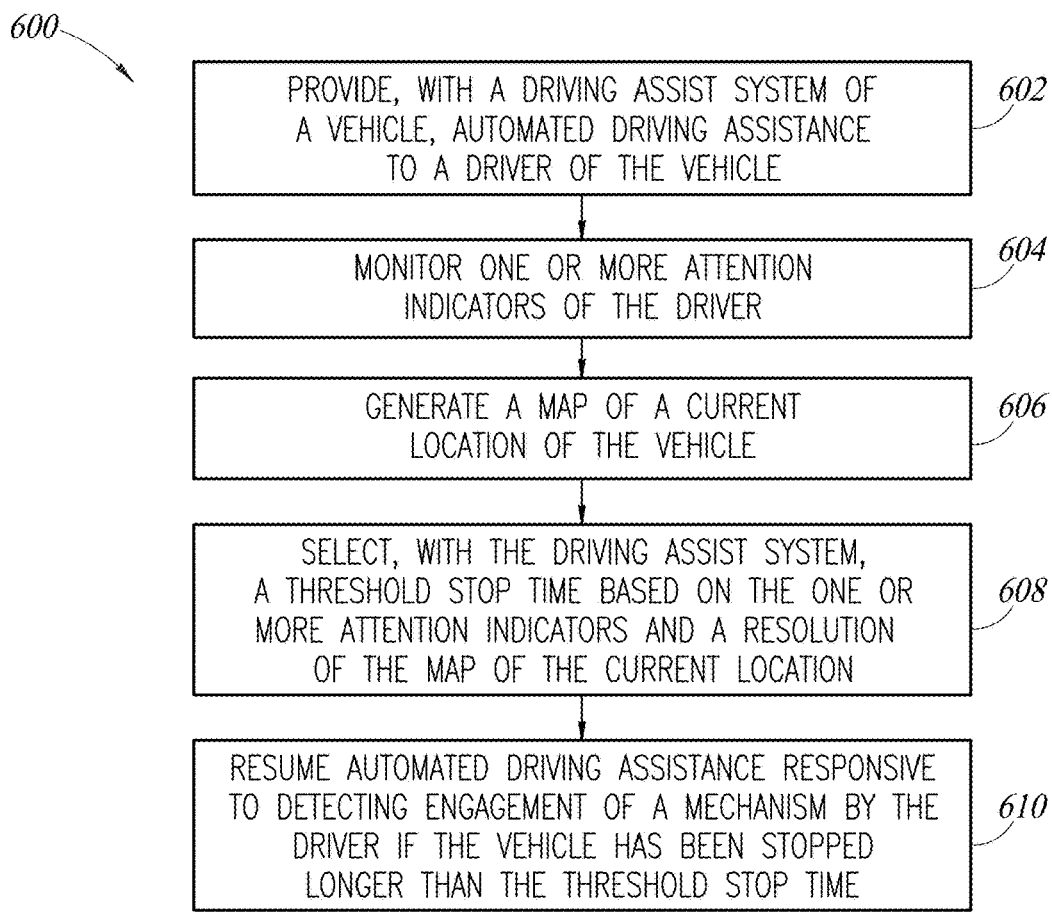
FIG. 5 is a chart indicating stop time thresholds based on various factors, according to one embodiment of the present disclosure.
FIG. 6 is a flow diagram of a process for operating the vehicle, according to one embodiment of the present disclosure.

FIG. 5 is a chart 146 indicating threshold stop times 148 based on various factors 150, according to one embodiment. The threshold stop time 148 is selected by the driving assist system 102 (illustrated in FIG. 1) based on the factors 150 including high-resolution maps, attentive driver, pedestrian present, animal present, and stop light or stop sign. It may be understood that other factors, such as surrounding vehicles or other obstacles, may also be taken into consideration to select the threshold stop time 148.

The chart 146 indicates that the threshold stop time 148 is selected at six instances 152 including A, B, C, D, E, and F. Each instance 152 may represent a time period when the vehicle 100 (illustrated in FIG. 1) comes to a stop while the vehicle 100 is the automated cruise control mode. To resume the automated cruise control mode, at each of these instances the appropriate threshold stop time 148 is selected.

As may be seen in FIG. 5, label 'Y' indicates that a factor 150 is present or detected and 'N' indicates a factor 150 is absent or not detected. Accordingly, the threshold stop time 148 selected at each instance 152 may vary or remain the same. The subsequent section provides details of the factors 150 at each instance to select a corresponding threshold stop time 148.

At instance A, the driving assist system 102 of the vehicle 100 detects that the map system 104 of the vehicle 100 has a high-resolution map available for a current location of the vehicle 100. In addition, the driver 138 at this instance is found to be attentive, i.e., the driver 138 is paying attention to a driving environment of the vehicle 100. Further, the sensor analysis system 108 of the vehicle 100 identifies that in the external environment of the vehicle 100 a stop sign is present. However, no other obstacle, i.e., animal 128 or pedestrian 126, is present. Accordingly, the driving assist system 102 may select the threshold stop time 148 of 15 seconds for instance A.

At instance B, the driving assist system 102 of the vehicle 100 detects that the driver 138 is attentive. There are no obstacles identified in the external environment of the vehicle 100. This indicates that no pedestrian 126, animal 128, and stop sign is detected by the sensor analysis system 108 of the vehicle 100. However, the map fetched by the map system 104 of the vehicle 100 has a low-resolution. As a result, the driving assist system 102 may select a higher threshold stop time 148 of 5 seconds for instance B.

At instance C, the driving assist system 102 of the vehicle 100 detects that the map system 104 of the vehicle 100 has a high-resolution map available for a current location of the vehicle 100. In addition, the driver 138 at this instance is found to be attentive. Also, there are no obstacles identified in the external environment of the vehicle 100. This indicates that no pedestrian 126, animal 128, and stop sign is detected by the sensor analysis system 108 of the vehicle 100. Accordingly, the driving assist system 102 may select a very high threshold stop time 148, for example, greater than 30 seconds. The threshold stop time 148 selected at instance C is indefinite.

At instance D, the driving assist system 102 of the vehicle 100 detects that the map system 104 of the vehicle 100 has a high-resolution map available for a current location of the vehicle 100. In addition, the driver 138 at this instance is found to be attentive. The sensor analysis system 108 of the vehicle 100 identifies that in the external environment of the vehicle 100 a pedestrian 126 is present. However, no other obstacles, i.e., animal 128 or stop sign, are detected in the external environment of the vehicle 100. Accordingly, the driving assist system 102 may select a threshold stop time 148 in a range of 0 seconds, due primarily to the presence of the pedestrian.

At instance E, the driving assist system 102 of the vehicle 100 detects that the map system 104 of the vehicle 100 has a high-resolution map available for a current location of the vehicle 100. In addition, the driver 138 at this instance is found to be attentive. The sensor analysis system 108 of the vehicle 100 identifies that in the external environment of the vehicle 100 an animal 128 is present. However, no other obstacles, i.e., pedestrian 126 or stop sign, are detected. Accordingly, the driving assist system 102 may select the threshold stop time 148 of 0 seconds for instance E, due primarily to the presence of the animal 128.

At instance F, the driving assist system 102 of the vehicle 100 detects that the map system 104 of the vehicle 100 has a high-resolution map available for a current location of the vehicle 100. However, the driver 138 is not found to be attentive at this instance. The sensor analysis system 108 of the vehicle 100 identifies that in the external environment of the vehicle 100 a step sign or a stop sign is present. However, no other obstacle, i.e., animal 128 or pedestrian 126, is present. Accordingly, the driving assist system 102 may select the threshold stop time 148 of 2 seconds for instance F.

The factors 150, instances 152, and threshold stop times 148 of FIG. 5 are given by way of example only. Other factors 150, instances 152, and threshold stop times 148 or ranges of stop times can be utilized without departing from the scope of the present disclosure.

Figure 7:
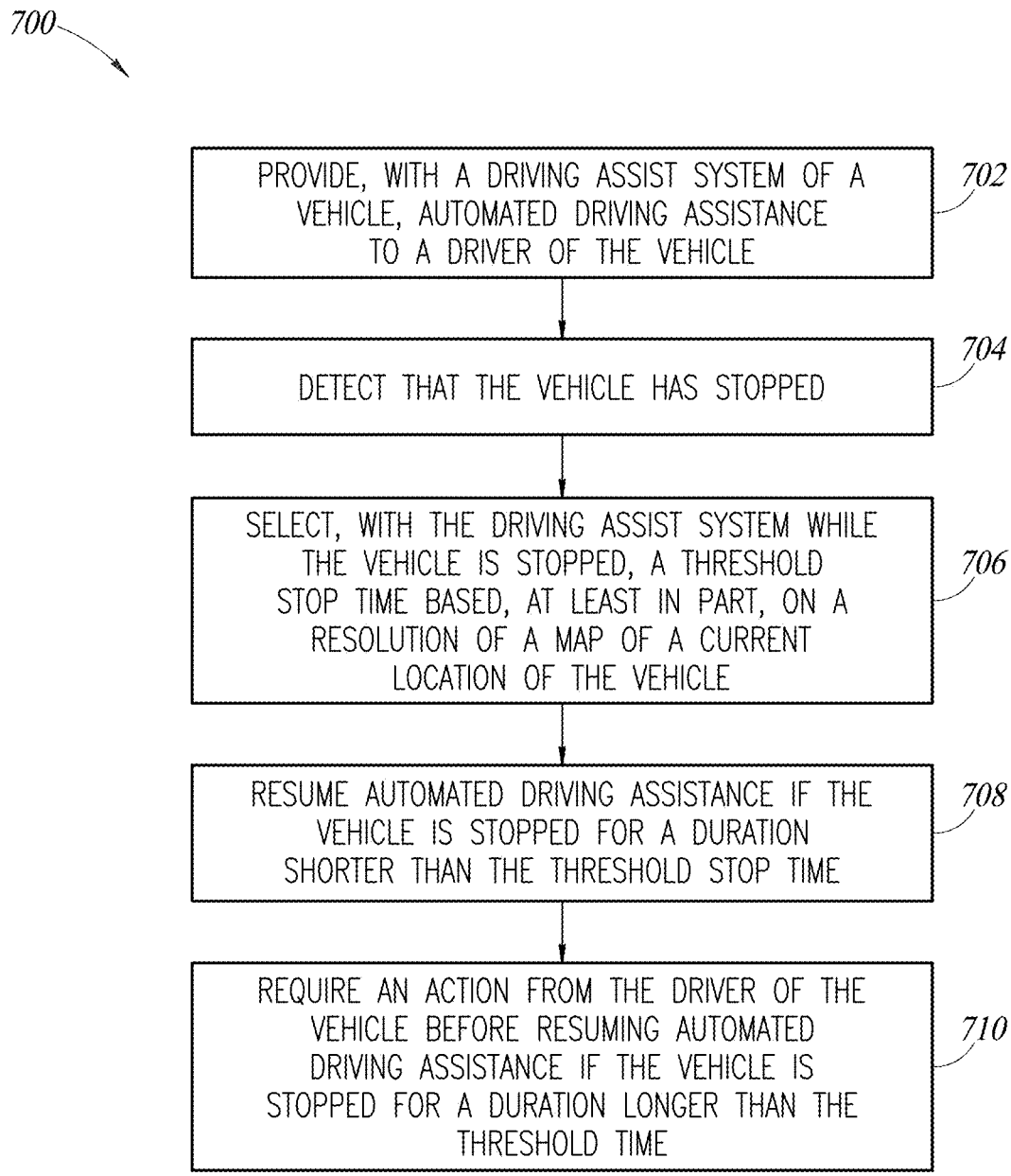
FIG. 7 is a flow diagram of a process for operating the vehicle, according to one embodiment of the present disclosure.

FIGS. 6 and 7 illustrate two preferred methods of operating the vehicle 100 according to one embodiment. The methods described below may be carried out using the configurations illustrated in FIGS. 1 through 5. Each step shown in FIGS. 6-7 represents one or more processes, methods or subroutines. Furthermore, the illustrated order of steps is illustrative only and the order of the steps may change according to the present disclosure. Additional steps may be added, or fewer steps may be utilized, without departing from the scope of the present disclosure.

FIG. 6 is a flow diagram of a method 600 for operating a vehicle, according to one embodiment. At 602, the method 600 includes providing, with a driving assist system of a vehicle, automated driving assistance to a driver of the vehicle. At 604, the method 600 includes monitoring one or more attention indicators of the driver. At 606, the method 600 includes storing, in a memory, a map of a current location of the vehicle. At 608, the method 600 includes selecting, with the driving assist system, a threshold stop time based on the one or more attention indicators and a resolution of the map of the current location. At 610, the method 600 includes resuming automated driving assistance responsive to detecting engagement of a mechanism by the driver if the vehicle has been stopped longer than the threshold stop time.

FIG. 7 is a flow diagram of a method 700 for operating a vehicle, according to another embodiment. At 702, the method 700 includes providing, with a driving assist system of a vehicle, automated driving assistance to a driver of the vehicle. At 704, the method 700 includes detecting that the vehicle has stopped. At 706, the method 700 includes selecting, with the driving assist system while the vehicle is stopped, a threshold stop time based, at least in part, on a resolution of a map of a current location of the vehicle. At 708, the method 700 includes resuming automated driving assistance if the vehicle is stopped for a duration shorter than the threshold stop time. At 710, the method 700 includes awaiting an action from the driver of the vehicle before resuming automated driving assistance if the vehicle is stopped for a duration longer than the threshold time.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
providing, with a driving assist system of a vehicle, automated driving assistance to a driver of the vehicle;
monitoring one or more attention indicators of the driver;
generating a map of a current location of the vehicle;
selecting, with the driving assist system, a threshold stop time based on the one or more attention indicators and a resolution of the map of the current location; and
resuming automated driving assistance responsive to detecting engagement of a mechanism by the driver if the vehicle has been stopped longer than the threshold stop time.

2. The method of claim 1, further comprising automatically resuming automated driving assistance if the vehicle has been stopped for a duration shorter than the threshold stop time.

3. The method of claim 2, wherein the automated driving assistance includes automated cruise control.

4. The method of claim 2, wherein the automated driving assistance includes automated lane-centering assistance.

5. The method of claim 1, wherein generating the map includes updating, as the vehicle travels, a seed map stored in a memory of the vehicle.

6. The method of claim 1, further comprising selecting the threshold stop time based, in part, on whether the map is a LIDAR map.

7. The method of claim 1, wherein monitoring attention indicators of the driver includes capturing images of the driver with one or more cameras.

8. The method of claim 7, wherein the attention indicators include a position of eyes of the driver.

9. The method of claim 7, wherein monitoring attention indicators includes determining a tilt of a head of the driver.

10. The method of claim 1, wherein selecting the threshold stop time includes selecting the threshold stop time from a pool of threshold stop times.

11. The method of claim 1, further comprising:
monitoring an external environment of the vehicle; and
selecting the threshold stop time based on the external environment of the vehicle.

12. The method of claim 11, further comprising selecting the threshold stop time based on whether or not pedestrians or animals are present in the external environment.

13. A vehicle, comprising:
one or more cameras configured to capture images of a driver;
a driver attention analysis system configured to analyze the images and to monitor attention indicators of the driver based on the images;
a map system configured to store a map of a current location; and
a driving assist system configured to provide automated driving assistance and to select a threshold stop time to resume automated driving assistance after a stop based on a resolution of the map and the attention indicators.

14. The vehicle of claim 13, further comprising a communication system configured to communicate with a remote information system and to receive updated map data from the remote information system, wherein the map system is configured to update the map based on the updated map data.

15. The vehicle of claim 13, further comprising one or more sensors configured to sense an external environment of the vehicle.

16. The vehicle of claim 15, further comprising a sensor analysis system configured to analyze signals from the one or more sensors and to generate environmental data based on the signals, wherein the driving assist system is configured to select the threshold stop time based on the environmental data.

17. A method, comprising:
providing, with a driving assist system of a vehicle, automated driving assistance to a driver of the vehicle;
detecting that the vehicle has stopped;
selecting, with the driving assist system while the vehicle is stopped, a threshold stop time based, at least in part, on a resolution of a map of a current location of the vehicle;
resuming automated driving assistance if the vehicle is stopped for a duration shorter than the threshold stop time; and
awaiting an action from the driver of the vehicle before resuming automated driving assistance if the vehicle is stopped for a duration longer than the threshold stop time.

18. The method of claim 17, wherein the action includes engaging an accelerator of the vehicle.

19. The method of claim 17, further comprising:
monitoring attention indicators of the driver while the vehicle is stopped; and selecting the threshold stop time based, at least in part, on the attention indicators.

20. The method of claim 17, wherein resuming automated driving assistance includes resuming hands free automated driving assistance.

\* \* \* \* \*